US010902074B2

(12) United States Patent
Broomhall et al.

(10) Patent No.: US 10,902,074 B2
(45) Date of Patent: Jan. 26, 2021

(54) RELATED POST IDENTIFICATION AND PRESENTATION

(71) Applicant: International Business Machines Corporation, Armonk, NY (US)

(72) Inventors: Matthew E. Broomhall, Goffstown, NH (US); Paul R. Bastide, Boxford, MA (US); Lin Sun, Cary, NC (US); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 16/008,796

(22) Filed: Jun. 14, 2018

(65) Prior Publication Data

US 2019/0384860 A1 Dec. 19, 2019

(51) Int. Cl.
*G06F 16/95* (2019.01)
*G06F 16/9535* (2019.01)
*G06F 16/34* (2019.01)
*G06F 40/30* (2020.01)
*G06F 40/205* (2020.01)

(52) U.S. Cl.
CPC ........ *G06F 16/9535* (2019.01); *G06F 16/345* (2019.01); *G06F 40/205* (2020.01); *G06F 40/30* (2020.01)

(58) Field of Classification Search
CPC .................................................. G06F 16/9539
USPC ......................................................... 707/736
See application file for complete search history.

(56) References Cited

U.S. PATENT DOCUMENTS

| 9,747,895 | B1* | 8/2017 | Jansche | G10L 15/183 |
| 2012/0272160 | A1* | 10/2012 | Spivack | G06Q 10/10 |
| | | | | 715/752 |
| 2013/0144656 | A1* | 6/2013 | Peak | G06Q 40/08 |
| | | | | 705/4 |
| 2013/0275348 | A1 | 10/2013 | Booth et al. | |
| 2014/0019389 | A1* | 1/2014 | Abbas | G06N 5/02 |
| | | | | 706/12 |
| 2014/0237344 | A1* | 8/2014 | Murata | G06F 3/0483 |
| | | | | 715/230 |
| 2015/0170294 | A1 | 6/2015 | Goyal et al. | |
| 2015/0324525 | A1* | 11/2015 | Saffran | G16H 10/60 |
| | | | | 705/3 |
| 2016/0055555 | A1* | 2/2016 | Mills | G06Q 30/0609 |
| | | | | 705/26.35 |
| 2016/0373397 | A1* | 12/2016 | Kesten | H04L 67/2842 |
| 2017/0201482 | A1 | 7/2017 | Ravishankar et al. | |
| 2017/0302613 | A1* | 10/2017 | Imbrie | H04L 51/32 |
| 2017/0325063 | A1* | 11/2017 | Curry | H04W 4/185 |

(Continued)

FOREIGN PATENT DOCUMENTS

WO WO-2014146189 A1 9/2014

*Primary Examiner* — Syling Yen
(74) *Attorney, Agent, or Firm* — Fabian VanCott; Steven L. Nichols (57) ABSTRACT

Related post identification and presentation is described. A system includes an interface to receive a base post generated by an author. An analyzer analyzes the base post and a number of other posts. A search engine of the system identifies from the number of other posts and based on the analysis, a number of related posts that relate to the base post. A posting engine of the system presents the base post along with identified related posts in an activity stream of a subscriber.

19 Claims, 6 Drawing Sheets

(56) References Cited

U.S. PATENT DOCUMENTS

2018/0097770 A1* 4/2018 Liu .................... G06F 3/04842
2018/0183852 A1* 6/2018 Jackson ............... G06Q 10/101

* cited by examiner

RELATED POST IDENTIFICATION AND PRESENTATION

BACKGROUND

The present invention relates to the presentation of posts within a user's activity stream, and more specifically to identifying posts that are related to a particular post and presenting the particular post and the related posts together to a subscriber's activity stream to increase post readership. Through an activity stream, a user can select content that they want to follow. Authors can draft articles and submit them. If the content selected by the subscriber and the article, or other content, published by the author match, the author's content can be displayed in the subscriber's activity stream.

SUMMARY

According to an embodiment of the present invention, a system for identifying and presenting posts related to a base post is described. The system includes an interface to receive a base post generated by an author, An analyzer analyzes the base post and a number of other posts. A search engine identifies, from the number of other posts and based on the analysis, a number of related posts that relate to the base post. A posting engine presents the base post along with the identified related posts in an activity stream of a subscriber.

A computer-implemented method is also described. In the method, a base post generated by an author is received and the text of that base post and a number of other posts are analyzed. Other posts are identified as related posts based on the analysis to the base post and the other posts. The base post and the identified related posts are presented in an activity stream of a subscriber.

The present specification also describes a computer program product. The computer program product includes a computer readable storage medium having program instructions embodied therewith. The program instructions are executable by a processor to cause the processor to 1) receive, from a subscriber, an indication of content, wherein posts related to the content are presented in an activity stream of the subscriber and 2) receive a base post generated by an author. The program instructions are also executable by the processor to cause the processor to 1) determine that the base post is related to the content, 2) analyze the text of the base post and a number of other posts, and 3) identify, from among the number of other posts and based on the analysis, a number of related posts which relate to the base post. The program instructions are also executable by the processor to cause the processor to present the base post along with identified related posts in the activity stream of the subscriber.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The interconnectedness of the world through the Internet has provided channels of information dissemination that were previously unfathomable. For example, news organizations, research facilities, and other entities can immediately disseminate information to a wide audience at the touch of a button. Such channels have not only revolutionized large scale information dissemination, but have opened the door for smaller publishers to similarly pass information to the public in general. For example, an author may write an article relating to a particular topic and with relative ease have that article accessible to millions. However, while such information channels have provided new and exciting ways to interconnect and educate the public at large, there are some aspects that may reduce their effectiveness.

For example, a subscriber can use an activity stream to aggregate posts related to content that the subscriber has selected. As a specific example, within a particular network, such as a social network, a user may indicate that they desire to be notified of posts related to the European economy. Accordingly, the activity stream of the subscriber may be populated with existing articles related to the European economy, and new articles/videos can be published to that user's activity stream as they are received. In such a system and with the ease of post publication, it may be difficult for an author to ensure that their post related to that topic is efficiently displayed to a user. That is, a lone post by an author may have little momentum and low impact to a particular reader and to the public in general. For example, an author may create an article related to a particular aspect of a topic. A subscriber to that topic may see the article along with many other articles, and disregard the stand alone importance of the post by the author related to the particular topic.

The impact of the post may be greater to a subscriber if that post is disseminated at the same time and same place as related posts. Accordingly, the present specification describes a system to orchestrate content momentum. This is done by identifying related posts and publishing them with either a temporal or spatial relation to the base post so as to increase the weight and consideration of the base post. Additionally, the related posts can cross reference each other, thus enhancing the impact of each post. In other words, the present specification describes a system wherein a base post from an author has awareness of other posts that would lend gravitas to the base post and that orchestrates the base post and related post presentation in the activity stream such that the content of the base post by the author resonates with the subscriber.

Thus, the present system offers the author of the base post a way to increase the impact of the content of their post with its readers. This is done by determining the relatedness of other posts and then pulling those other posts along with it and to provide an effective method to interleave the other content in the activity stream of the reader such that it increases the overall momentum of that topic.

As used in the present specification and in the appended claims, the term "post" refers to media content that is uploaded through a network. A post may be text, audio, and/or video content related to a particular topic.

Still further, a "base post" refers to a post by an author which other post are compared to and presented alongside given a benchmark similarity.

As used in the present specification and in the appended claims, the term "a number of" or similar language is meant to be understood broadly as any positive number including 1 to infinity.

Figure 1:
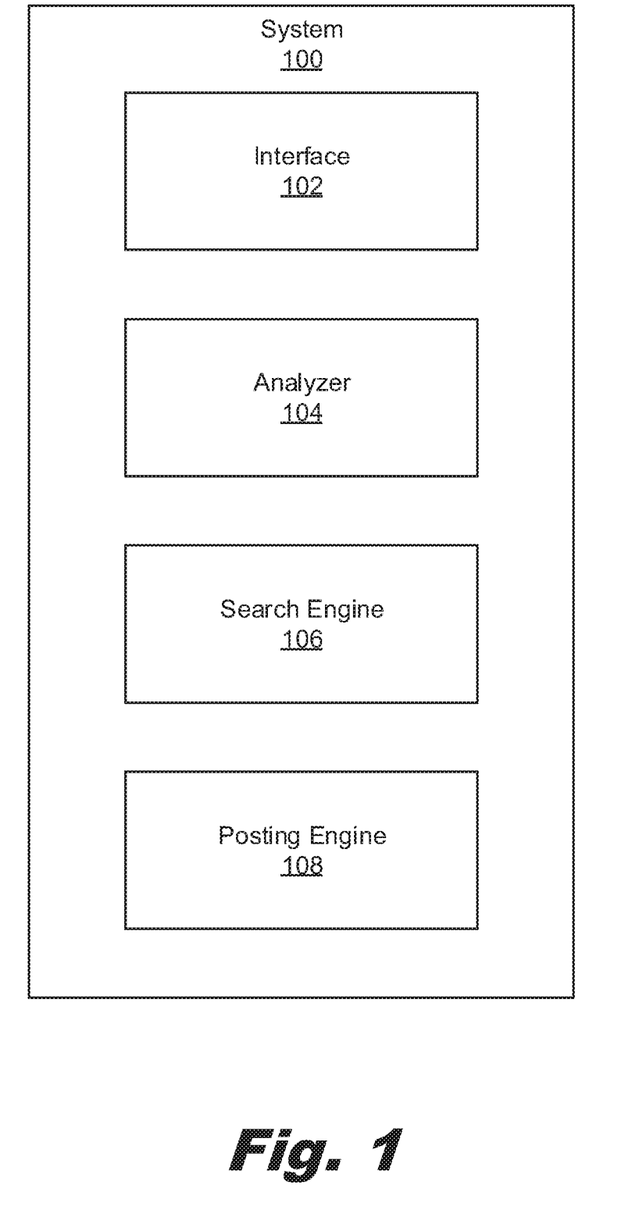
FIG. 1 depicts a system for identifying and presenting related posts, according to an example of principles described herein.

Turning now to the figures, FIG. 1 depicts a system (100) for identifying and presenting related posts, according to an example of principles described herein. To achieve its desired functionality, the system (100) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

The system (100) includes an interface (102) to receive a base post generated by an author. For example, the system (100) may be an aggregator that collects various posts from various authors and disseminates those posts to subscribers. Accordingly, via an interface (210) a user may post an article, video, or other form of media content to the system (100) whereby it may be disseminated to the public in general. In such an interface (102), a user may drag and drop their article or post, or may create their post directly in the interface (102).

The system (100) also includes an analyzer (104) which analyzes the base post and a number of other posts. Specifically, the analyzer (104) can analyze the base post and other posts to determine a topic, theme, various keywords, and other characteristics of those posts. The information gleaned from such an analysis is used to identify related posts that have similar characteristics. Various types of analysis may be performed. For example, the analyzer (104) could perform semantic analysis. Semantic analysis refers to a process wherein a corpus of text is analyzed and certain information about the text determined. The analyzer (104) may also perform topical analysis and assign a topic to the base post. In yet another example, the analyzer (104) may collect data relating to the context of the base post such as when the base post was generated and a geographic location where the base post originated. As described above, while specific reference is made to particular types of analysis, the analyzer (104) may perform any variety of analysis on the base post to obtain contextual data about the base post, which contextual data provides criteria by which other base posts are associated with the base post.

Based on an output of the analyzer (104), the search engine (106) identifies other posts that are related to the base post, That is, in addition to the analysis performed on the base post by the author to determine context, etc., the analyzer (104) performs a similar analysis of a corpus of other posts, determining a context of those posts. Then based on a similarity analysis, the search engine (106) can determine which, if any, other posts are related to the base post by the author.

As a specific example, an author may generate a base post relating to the history of the Egyptian Pharaohs. Following the operation of the analyzer (104) and the search engine (106) three other posts related to Egyptian pharaohs may be selected as related posts that are related to the base post by the author.

The search engine (106) may rely on other criteria in identifying the related posts that are to be presented alongside the base post. As one example, the related posts may be identified based on historical data from the subscriber. For example, the subscriber on whose activity stream the posts are ultimately presented, may historically show interest, i.e., via reading or clicking on, posts by a particular author, posts of a particular word count, or posts published via a particular entity, etc. Accordingly, the system (100) may include a database that indicates subscriber preferences such that the related posts are identified based on such information. As an example, the system (100) may include a list of posts already consumed by the subscriber that have been seen and validated by the subscriber. Other validated content including sites from the bookmarks or a user's browsing history is also considered. Such information can be used to identify the related posts. Along these lines, when the author's base post is inserted into the activity stream, the system (100) will be triggered to process the adequacy of its insertions.

Similarly, the related posts may be identified based on historical data from multiple subscribers. For example, just as with a particular subscriber, the multiple subscribers to a particular content feed may historically select posts with particular words, by particular publishers, etc. This metadata may be used to identify related posts that are to be presented along with the author's base post. Relying on a particular subscriber, or multiple subscribers historical tendencies ensures that the related posts that are identified are those most likely to impact the subscriber. Accordingly, by associating the author's base post with these related posts that are likely to impact a subscriber, the subscriber's attitude toward the author's base post is likely to increase due to its association with these proven posts.

As an additional example, the search engine (106) identifies the related posts based on the publication platform credibility. For example, if the publication platform is a well-respected reliable news outlet, a related post may be identified to be associated with the author's base post. By comparison, if the publication platform has a low readership and is questionable, based on reviews, a post from that publication platform may not be identified. By associating the base post of the author with credible posts from credible sites, the gravitas and momentum of the author's base post is enhanced.

As yet another example, the search engine (106) identifies the related posts based on user ratings. That is, a user may rate a post, rate an author, and/or rate a publication platform. The search engine (106) can collect this information and rely on it in determining whether a candidate additional post is likely to be well-received by a user. As described above, the rating may be for a particular subscriber to content, or multiple subscribers to the content.

Yet another criteria for determining which other posts to identify include a number of followers. That is, certain authors or publication platforms may have a certain number of followers. The number of followers of a publication platform or an author lends credibility to that author or publication platform, such that it would be beneficial for the author's base post to be associate with them.

Other examples of determining the adequacy of the other posts exist as well. One such example is word count. For example, if the search engine (106) determines that other posts are short and concise, then the search engine (106) will check whether the author's base post has the same number of words, or a difference in word count within predetermined range, of those other posts.

Note that in this example, as the identification of related posts may be based on metadata relating to a particular subscriber, the related posts that are associated with the author's base post may be unique to that particular subscriber, thus providing a customized feed to highlight an author's base post. When the related posts are identified based on metadata relating to multiple subscribers, there is a greater likelihood that a wide audience will resonate with that base post. Moreover, the trends of multiple subscribers may map to the potential trends of a particular subscriber.

The system (100) also includes a posting engine (108) to present the base post along with identified related posts in an activity stream of a subscriber. That is, the posting engine (108) receives the related posts identified by the search engine (106) and visually displays them to a subscriber. Again, by associating the author's base post with related posts, the author's base post is elevated in relevance in the mind of the subscriber. The posting engine (108) relies on a number of criteria in determining when and how to post the author's base post and the related posts.

For example, the posting engine (108) may present the identified related posts based on a time delay or a content delay. That is, rather than presenting the author's base post and the related posts as a block, they may be separated, with the base post and identified related posts in a particular order, or no particular order. For example, one of the related posts may be posted and the author's base post may be delayed in time, for example after 5 minutes, or delayed in content, for example following two intermediate unrelated posts. Doing so may highlight in the subscriber's mind the importance of the topic. However, in other examples, the author's base post and the related posts may be presented in a block.

As with the identification of related posts, the posting engine (108) may time the presentation of the author's base post and the related posts based on historical data from the subscriber, or multiple subscribers. For example, the metadata for a particular user may indicate that the user generally clicks on a post first thing in the morning, and generally does not click on posts presented after 5:00 in the evening. Accordingly, the posting engine (108) may target posting the author's base post and the related posts first thing in the morning and may avoid posting after 5:00 in the afternoon. Thus, the posts are presented at a time when it is most likely the subscriber will pay attention to it.

Similar information for multiple subscribers may indicate that during lunch is when most, or a large group, of subscribers access content. Accordingly, by targeting presentation of the posts during this time, the author's post is more likely to be accessed by a large group of subscribers.

In some examples, the posting engine (108) indicates the relationship between the author's base post and the related posts. For example, a flag, or other marker may indicate that the related posts were found to be similar to the author's base post. This may lend gravitas to the author's base post by clearly indicating its relevance to the related posts. In the example where the related posts are those identified based on a likely interest to a subscriber based on historical data, this effect is particularly relevant. In another example, the posting engine (108) hides such a relationship. Hiding the relationship may be equally relevant as it makes the author's base post have a more natural feel and appearance to it in the activity stream.

In some examples, the posting engine (108) posts the related posts differently than the author's base post and differently than other posts in the activity stream. For example, the related posts may be presented as links, or may be indicated when a subscriber hover's over the author's base post. Doing so may declutter the activity stream by reducing the number of overall posts therein, while still allowing a user to view the related posts that lend gravitas to the author's base post.

In some examples, the posting engine (108) is a machine-learning engine to learn optimal presentation characteristics. For example, the posting engine (108) during one event may present the related posts subliminally, that is without indicating a relationship with the author's base post. The posting engine (108) may learn that the studied group of subscribers do not appreciate or consider the author's base post any more than they otherwise would. Accordingly, in the next instance, the posting engine (108) may post the related posts directly, that is by indicating their relationship to the author's base post. In this example, the presentation and selection of the related content may be rotated until a desired level of momentum for the author's base post, and the related posts, is realized. While one particular example has been provided of whether to present the related posts directly or subliminally, other aspects of the presentation and identification of related posts may involve machine learning as well. For example, which types of related posts, how many related posts, a timing of the presentations, etc. may be iteratively investigated, either for a single subscriber or a group of subscribers, until an optimum level of post momentum is achieved.

In some examples, both the search engine (106) and the posting engine (108) may rely on user input to determine which posts to include for presentation. For example, the author may manually select a few particular posts that they desire to associate with their base post. Accordingly, the search engine (106) may include these posts in its grouping and the posting engine (108) can present these posts in any manner described above, i.e., with a time delay, with a content delay, at a particular time during the day, as a link as a full article, etc.

In summary, when the search engine (106) determines there are significant similarities between the author's base post and the other posts and based on the criteria mentioned above, the search engine (106) will identify certain related posts and the posting engine (108) allows the author's base post and the related posts to be seen by the subscriber.

The system (100) as described herein may be implemented as a feed reader, social platform, collaboration platform and may be used with blogs, forums, and websites to list a few. Moreover, in some examples, the system (100) may be implemented at the point of taking content i.e., the author's side, at a server, or at the point of receiving content, i.e., the subscriber's side.

Figure 2:
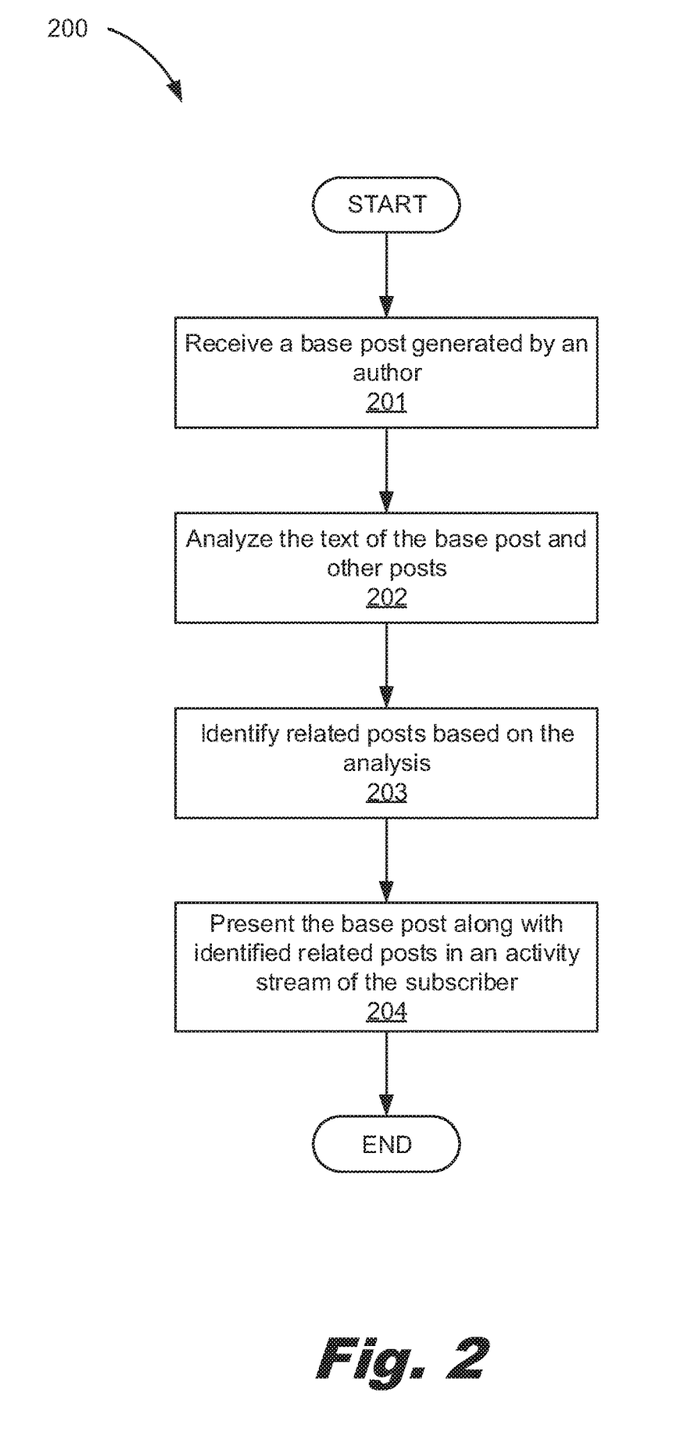
FIG. 2 depicts a flowchart of a method for identifying and presenting related posts, according to an example of principles described herein.

FIG. 2 depicts a flowchart of a method (200) for identifying and presenting related posts, according to an example of principles described herein. According to the method (200), a base post generated by an author is received (block 201). As described above, a post refers to any media content, such as text, video, audio, or graphics generated by an author and to be published in activity streams of subscribers and a base post is that post to which others are compared to determine if they relate. An activity stream of a user refers to any platform where information is aggregated and may include a news feed and a social media timeline to name a few. Receiving (block 201) the base post may include receiving via an interface (FIG. 1, 102) where a user drags and drops the base post. In another example, the interface (FIG. 1, 102) allows a user to create the base post.

Once created, the system (FIG. 1, 100) and more particularly the analyzer (FIG. 1, 104) analyzes (block 202) the text of the base post and a number of other posts. There are any number of ways that the analyzer (FIG. 1, 104) could analyze (block 202) the text including, but not limited textual analysis, topical analysis, semantic analysis, temporal analysis, geographic location analysis, etc. Moreover, while a few specific examples are provided, any other type of analysis may be performed on the text. Such an analysis provides criteria by which the base post can be compared to other posts. Similar analysis is performed on the other posts and a search engine (FIG. 1, 106) identifies (block 203) related posts from those that are analyzed.

That is, the search engine (FIG. 1, 106) relies on the analysis performed on various posts, and using the results of the analysis determines a particular similarity between the author's base post and other posts. In some examples, the search engine (FIG. 1, 106) relies on other criteria to determine which posts to identify (block 203) as related. For example, the search engine (FIG. 1, 106) may consider historical trends for the subscriber, or a group of subscribers, platform credibility, followers of the authors of the other posts, user ratings, word count, etc. While particular reference is made to a few criteria on which additional post selection is made, other criteria may be relied on as well.

The results of the search engine (FIG. 1, 106) are passed to a posting engine (FIG. 1, 108) which presents (block 204) the author's base post along with identified related posts in an activity stream of the subscriber. That is, the author's base post and the related posts are disposed in the activity stream of the subscriber, and in some cases a notification generated and presented to the subscriber. As described above, the posting engine (FIG. 1, 108) may present the posts in any number of ways including identifying a relation between the base post and the related posts, hiding this relationship, presenting all the posts as a block, presenting the posts with gaps of time or content there between, etc. In this example, both the identification (block 203) and the presentation (block 204) of the author's base post and the related posts may be based on machine learning which determines, over the course of time, the most effective related posts and the most effective manner of presenting the related posts and the author's base post.

Accordingly, the method (200) as described herein provides for the association of multiple related posts. Such an association may lead to an enhanced importance in the mind of a subscriber as an author's base post is grouped with other related posts. Without such grouping, a subscriber may dismiss a particular post as being irrelevant. However, by populating an activity stream with related content, the irrelevance of a particular post may be dismissed due to its being similar in content and format as other posts, some of which may be credible and already validated by a particular user, and then displaying these posts in proximity to one another. The method (200) also ensures that the base post is presented to the subscriber in a fashion that is likely to be relevant to the subscriber, which is in a fashion and in a way that the subscriber is likely to positively respond to the post.

Figure 3:
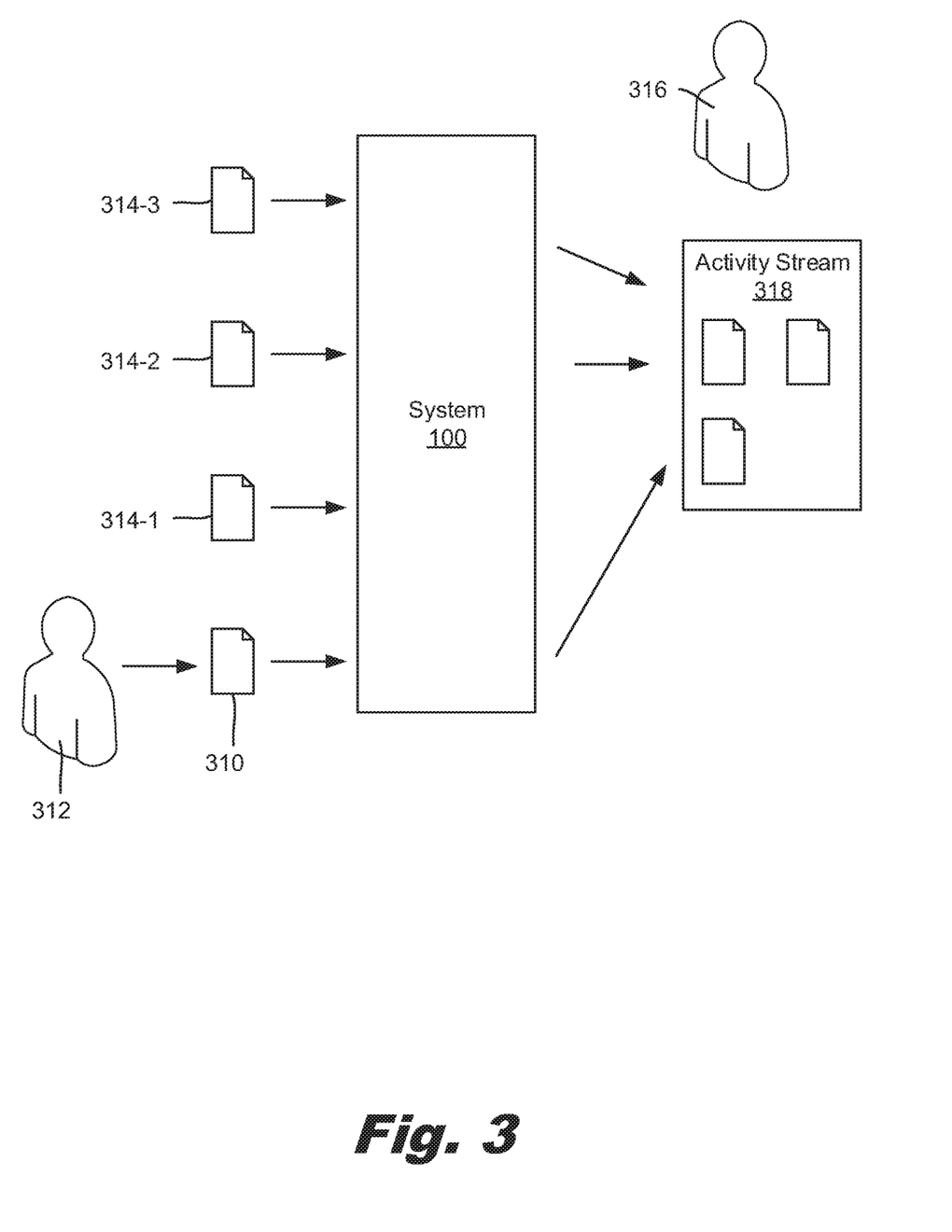
FIG. 3 depicts the identification, selection, and presentation of related posts, according to an example of principles described herein.

FIG. 3 depicts the identification, selection, and presentation of related posts, according to an example of principles described herein. As described above, an author (312) may generate a base post (310) to be presented on a subscriber's (316) activity stream (318). The activity stream (318) may be an aggregator that collects posts from various sources and displays them in a single location for a subscriber (316). The activity stream (318) may generate push notifications when new content is added to the activity stream (318).

Returning to the author's base post (310). This base post (310) may be passed to the system (100) along with a number of other posts (314-1, 314-2, 314-3) authored by any number of individuals or entities. The analyzer (FIG. 1, 104) of the system (100) then analyzes the base post (310) and the other posts (314-1, 314-2, 314-3) to obtain data describing the context and other characteristics of the posts (310, 314-1, 314-2, 314-3). A search engine (FIG. 1, 106) then identifies which of the other posts (314-1, 314-2, 314-3) are similar to within a predetermined degree, and therefore can be presented alongside, the author's base post (310) in the activity stream (318). Criteria that may be used to determine similarity include semantic similarity, topical similarity, temporal similarity, i.e., if the posts were written around the same time, geographical similarity, i.e., if the posts were generated in the same general region, etc. While specific reference is made to specific criteria, any number of criteria may be used to determine similarity between different posts (310, 314-1, 314-2, 314-3).

As described above, in addition to considering the similarity of the posts (310, 314-1, 314-2, 314-3), the search engine (FIG. 1, 106) may rely on other criteria such as user ratings, platform credibility, and historical information, in determining which are selected. While specific reference is made to particular additional criteria, any number of additional criteria on top of similarity criteria may be sued to determine which of the other posts (314-1, 314-2, 314-3) should be presented alongside the author's base post (310). In the example depicted in FIG. 3, the second and third other posts (314-2, 314-3) have been found to be substantially similar based on the criteria and the first other post (314-1) has been found not to be substantially similar for not meeting the criteria as described above. Accordingly, the second and third posts (314-2, 314-3) may be classified as related posts.

With the related posts identified, the posting engine (FIG. 1, 108) presents the author's base post (310) and the other posts in the activity stream (318). Specifically, as the first other post (314-1) was not identified as being a related post to be associated with the author's base post (310) it is not presented along with the author's base post (310) in the activity stream (318) of the subscriber (316). As described above, there are any number of ways that the posts may be presented. For example, a relation may be explicitly indicated or hidden. And there may or may not be a time delay in when different posts are presented.

Figure 4:
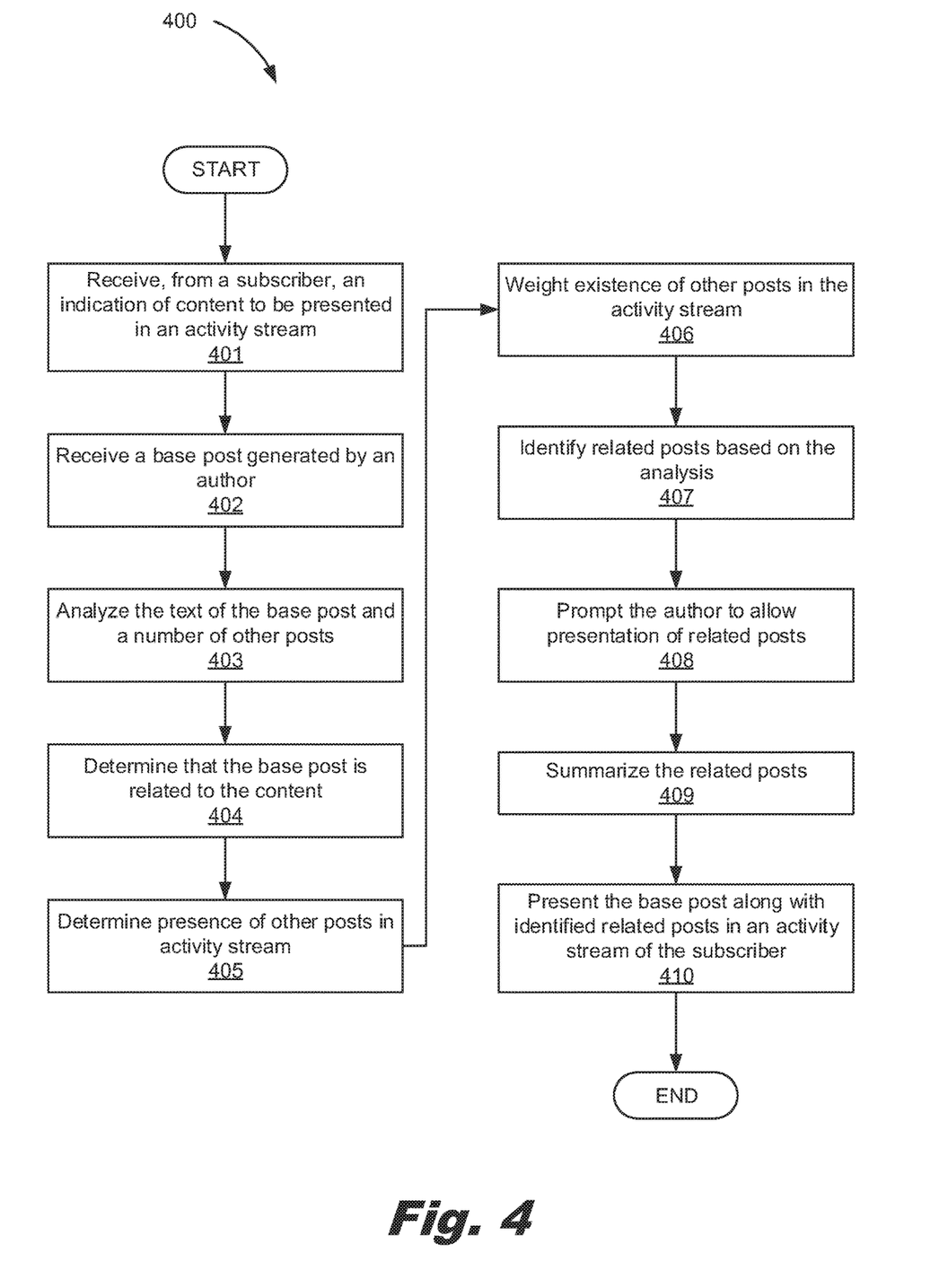
FIG. 4 depicts a flowchart of a method for identifying and presenting related posts, according to an example of principles described herein.

FIG. 4 depicts a flowchart of a method (400) for identifying and presenting related posts, according to an example of principles described herein. In this example, the system (FIG. 1, 100) may receive (block 401) from a subscriber (FIG. 3, 316) an indication of content to be presented in the activity stream (FIG. 3, 318). For example, on signup or during any other period of time a user may select content they want to follow. In some examples, selecting content may include selecting topics that a subscriber (FIG. 3, 316) wants to follow as well as formatting for that content. For example, a subscriber (FIG. 3, 316) may select to follow just text articles and text articles having a particular length, or content that has been posted within a certain time period. Accordingly, when posts are received that relate to that content, they are posted to the subscriber's (FIG. 3, 316) activity stream (FIG. 3, 318) and notifications may be sent to the subscriber (FIG. 3, 316) when such content is available.

A base post (FIG. 3, 310) is then received (block 402) from an author (FIG. 3, 312) and the base post (FIG. 3, 310) and other posts (FIG. 3, 314) are analyzed (block 403) by the analyzer (FIG. 1, 104). These operations may be performed as described above in connection with FIG. 2.

Following such analysis (block 403), it is determined (block 404) whether the author's (FIG. 3, 312) base post (FIG. 3, 310) is related to the content selected by the subscriber (FIG. 3, 316). That is, the analysis of the author's (FIG. 3, 312) base post (FIG. 3, 310) may indicate a topic for the base post (FIG. 3, 310) and indicate other characteristics. If this topic and other characteristics of the author's (FIG. 3, 312) base post (FIG. 3, 310) align with the content identified by the subscriber (FIG. 3, 316), further analysis is performed. By comparison, if the topic and other characteristics of the author's (FIG. 3, 312) base post (FIG. 3, 310) do not align with the content identified by the subscriber (FIG. 3, 316) no further analysis, i.e., identification and presentation, are performed.

In some examples, it may be determined (block 405) whether the other posts (FIG. 3, 314) are already in the activity stream (FIG. 3, 318) of the subscriber (FIG. 3, 316). That is, the other posts (FIG. 3, 314) may already have been presented in the activity stream (FIG. 3, 318) of the subscriber (FIG. 3, 316). Accordingly, the existence of these other posts (FIG. 3, 314) in the activity stream (FIG. 3, 318) is weighed (block 406). For example, if any of the other posts (FIG. 3, 314) are already in the activity stream (FIG. 3, 318), identification of these other posts (FIG. 3, 314) as related posts may be prevented so as to not be redundant and not clutter the activity stream (FIG. 3, 318). By comparison, if any of the other posts (FIG. 3, 314) are already on the activity stream (FIG. 3, 318), this may weigh towards presenting those other posts (FIG. 3, 314) as related posts as the redundancy may further increase the importance of the topic and author's (FIG. 3, 312) base post (FIG. 3, 310) in the mind of the subscriber (FIG. 3, 316). That is, the repeated exposure may further elevate the importance of the author's (FIG. 3, 312) base post (FIG. 3, 310) in the eyes of the subscriber (FIG. 3, 316). Determining (block 405) the presence of any of the other posts (FIG. 3, 314) in the activity stream (FIG. 3, 318) may be performed over a predetermined period of time. That is, the activity stream (FIG. 3, 316) may be searched to determine if the other posts (FIG. 3, 314) were posted within the past hour, past day, or past week. If the other posts (FIG. 3, 314) exist, but are outside of the time window, a subscriber (FIG. 3, 316) may not remember that article and it may serve to remind the subscriber (FIG. 3, 316) of that article.

Related posts are then identified (block 407) and selected based on the results of the analysis of the author's (FIG. 3, 312) base post (FIG. 3, 310) as well as an analysis of other posts (FIG. 3, 314) uploaded to the system (FIG. 1, 100). This may be performed as described above in connection with FIG. 3.

In some examples, the system (FIG. 1, 100) prompts (block 408) the author (FIG. 3, 312) to allow the presentation of the related posts. For example, the prompt (block 408) may indicate to the author (FIG. 3, 312) that certain posts have been deemed similar and likely to lend gravitas to the author's (FIG. 3, 312) base post (FIG. 3, 310) and that therefore it is recommended they be included along with the author's (FIG. 3, 312) base post (FIG. 3, 310) in the subscriber's (FIG. 3, 316) activity stream (FIG. 3, 318). Based on this prompt, the author (FIG. 3, 312) may either elect to allow or restrict the inclusion of some or all of the related posts alongside the author's (FIG. 3, 312) base post (FIG. 3, 310).

As described above, there may be any number of ways that the posting engine (FIG. 1, 108) presents the related posts. One such example is to summarize (block 409) the related posts, and present (block 410) the summaries of the related posts alongside the author's (FIG. 3, 312) base post (FIG. 3, 310). Doing so may communicate to the subscriber (FIG. 3, 315) that the author's (FIG. 3, 312) post (FIG. 3, 310) is relevant, but not draw attention away from the author's (FIG. 3, 312) base post (FIG. 3, 310). Moreover, just summarizing (block 409) the related posts may impart a time-saving feature for the subscriber (FIG. 3, 316) as he/she does not have to read the entire related post.

The base post (FIG. 3, 310) and the related posts are then presented (block 410) in the subscriber's (FIG. 3, 316) activity stream (FIG. 3, 318). This may be performed as described above in connection with FIG. 2.

Figure 5:
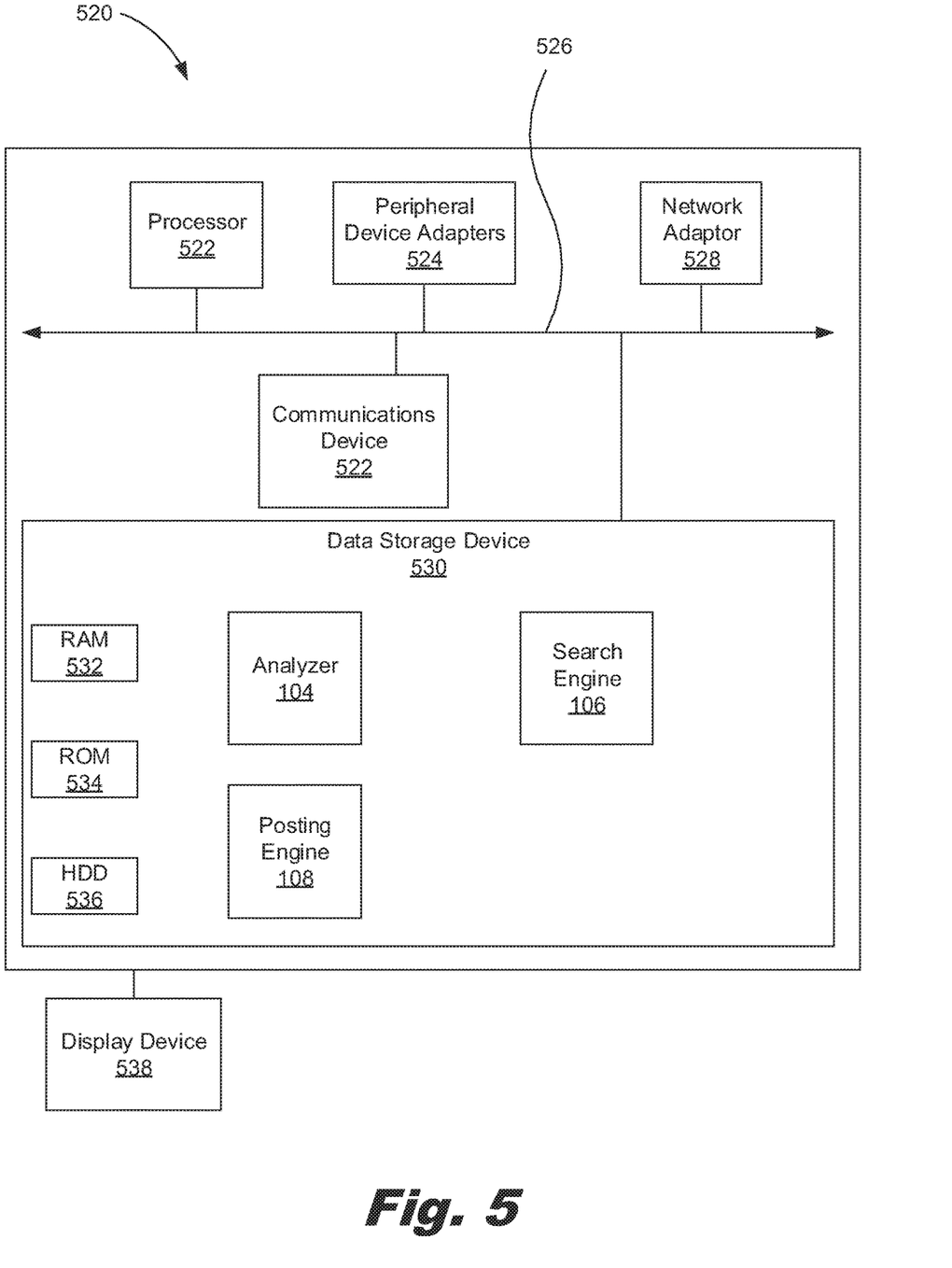
FIG. 5 is a diagram of a computing system for identifying and presenting related posts, according to an example of the principles described herein.

FIG. 5 is a diagram of a computing device (520) for identifying and presenting related posts, according to an example of the principles described herein. The computing device (520) may be implemented in an electronic device. Examples of electronic devices include servers, desktop computers, laptop computers, personal digital assistants (PDAs), mobile devices, smartphones, gaming systems, and tablets, among other electronic devices.

The computing device (520) may be utilized in any data processing scenario including, stand-alone hardware, mobile applications, through a computing network, or combinations thereof. Further, the computing device (520) may be used in a computing network. In one example, the methods provided by the computing device (520) are provided as a service over a network by, for example, a third party.

To achieve its desired functionality, the computing device (520) includes various hardware components. Among these hardware components may be a number of processors (522), a number of data storage devices (530), a number of peripheral device adapters (524), and a number of network adapters (528). These hardware components may be interconnected through the use of a number of busses and/or network connections. In one example, the processor (522), data storage device (530), peripheral device adapters (524), and a network adapter (528) may be communicatively coupled via a bus (526).

The processor (522) may include the hardware architecture to retrieve executable code from the data storage device (530) and execute the executable code. The executable code may, when executed by the processor (522), cause the processor (522) to implement at least the functionality of identifying and presenting related posts. The functionality of the computing device (520) is in accordance to the methods of the present specification described herein. In the course of executing code, the processor (522) may receive input from and provide output to a number of the remaining hardware units.

The data storage device (530) may store data such as executable program code that is executed by the processor (522) or other processing device. As will be discussed, the data storage device (530) may specifically store computer code representing a number of applications that the processor (522) executes to implement at least the functionality described herein.

The data storage device (530) may include various types of memory modules, including volatile and nonvolatile memory. For example, the data storage device (530) of the present example includes Random Access Memory (RAM)

(532), Read Only Memory (ROM) (534), and Hard Disk Drive (HDD) memory (536). Many other types of memory may also be utilized, and the present specification contemplates the use of many varying type(s) of memory in the data storage device (530) as may suit a particular application of the principles described herein. In certain examples, different types of memory in the data storage device (530) may be used for different data storage needs. For example, in certain examples the processor (522) may boot from Read Only Memory (ROM) (534), maintain nonvolatile storage in the Hard Disk Drive (HDD) memory (536), and execute program code stored in Random Access Memory (RAM) (532).

The data storage device (530) may include a computer readable medium, a computer readable storage medium, or a non-transitory computer readable medium, among others. For example, the data storage device (530) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device. The data storage device (530) may include the analyzer (104), search engine (106), and posting engine (108) as described above.

The hardware adapters (524, 528) in the computing device (520) enable the processor (522) to interface with various other hardware elements, external and internal to the computing device (520). For example, the peripheral device adapters (524) may provide an interface to input/output devices, such as, for example, display device (538), a mouse, or a keyboard. The peripheral device adapters (524) may also provide access to other external devices such as an external storage device, a number of network devices such as, for example, servers, switches, and routers, client devices, other types of computing devices, and combinations thereof.

The display device (538) may be provided to allow a user of the computing device (520) to interact with and implement the functionality of the computing device (520). The peripheral device adapters (524) may also create an interface between the processor (522) and the display device (538), a printer, or other media output devices. The network adapter (528) may provide an interface to other computing devices within, for example, a network, thereby enabling the transmission of data between the computing device (520) and other devices located within the network.

The computing device (520) may, when executed by the processor (522), display the number of graphical user interfaces (GUIs) on the display device (538) associated with the executable program code representing the number of applications stored on the data storage device (530). The GUIs may display, for example, interactive screenshots that allow a user to interact with the computing device (520). Examples of display devices (538) include a computer screen, a laptop screen, a mobile device screen, a personal digital assistant (PDA) screen, and a tablet screen, among other display devices (538). In some examples, the display device (538) is an example of the interface (FIG. 1, 102) through which an author (FIG. 3, 312) generates a base post (FIG. 3, 310).

Figure 6:
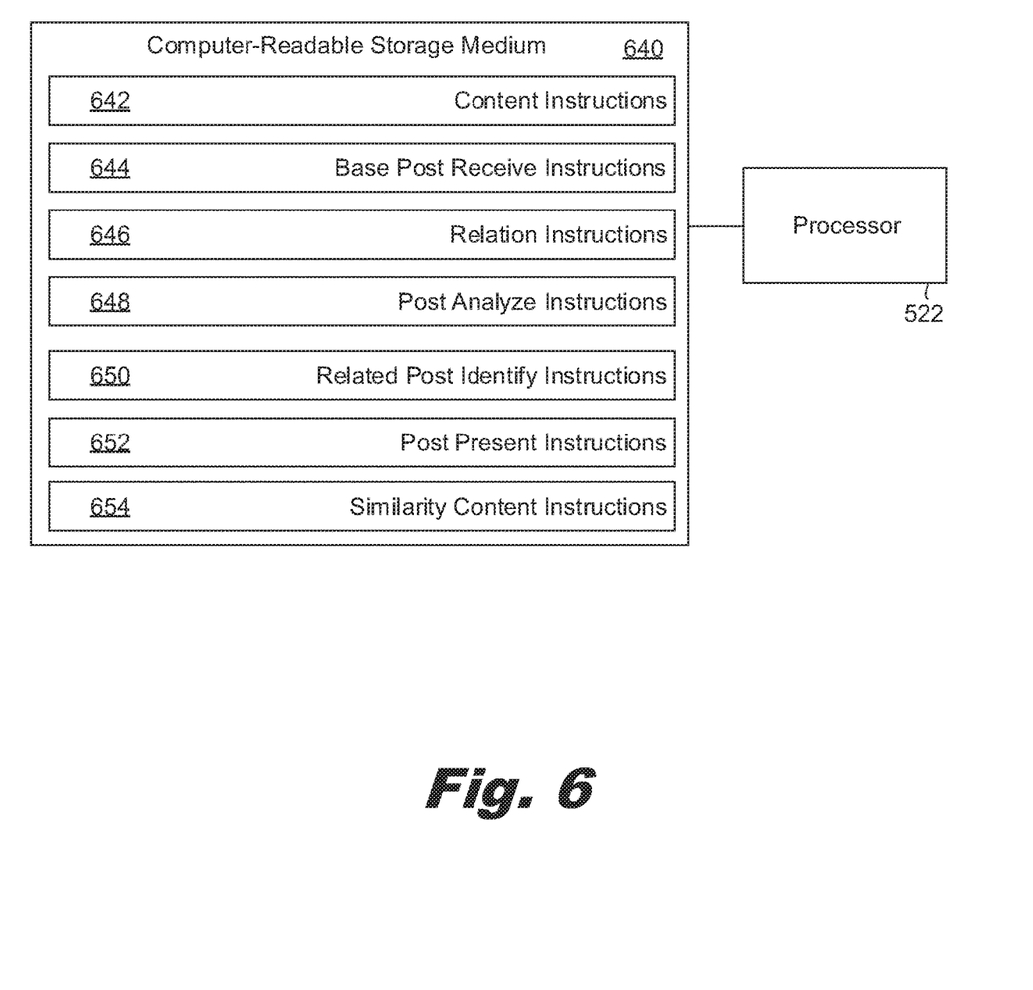
FIG. 6 depicts a computer readable storage medium for identifying and presenting related posts, according to an example of principles described herein.

FIG. 6 depicts a computer readable storage medium (640) identifying and presenting related posts, according to an example of principles described herein. To achieve its desired functionality, a computing system includes various hardware components. Specifically, a computing system includes a processor (522) and a computer-readable storage medium (640). The computer-readable storage medium (640) is communicatively coupled to the processor (522). The computer-readable storage medium (640) includes a number of instructions (642, 644, 646, 648, 650, 652, 654) for performing a designated function. The computer-readable storage medium (640) causes the processor (522) to execute the designated function of the instructions (642, 644, 646, 648, 650, 652, 654).

Referring to FIG. 6, content instructions (642), when executed by the processor (522), cause the processor (522) to receive, from a subscriber (FIG. 3, 316), an indication of content, wherein posts related to the content are presented in an activity stream (FIG. 3, 318) of the subscriber (FIG. 3, 316). Base post receive instructions (644), when executed by the processor (522), may cause the processor (522) to receive a base post (FIG. 3, 310) generated by an author (FIG. 3, 312). Relation instructions (646), when executed by the processor (522), may cause the processor (522) to, determine that the base post (FIG. 3, 310) is related to the content. Post analyze instructions (648), when executed by the processor (522), may cause the processor (522) to analyze the text of the base post (FIG. 3, 310) and a number of other posts (FIG. 3, 314). Related post identify instructions (650), when executed by the processor (522), may cause the processor (522) to identify related posts to the base post (FIG. 3, 310) based on the analysis. Post present instructions (652), when executed by the processor (522), may cause the processor (522) to present the base post (FIG. 3, 310) along with identified related posts in the activity stream (FIG. 3, 318) of the subscriber (FIG. 3, 316). Similarity content instructions (654), when executed by the processor (522), may cause the processor (522) to receive, from the author (FIG. 3, 312), an indication of similarity content by which related posts are identified. For example, the similarity of different posts, as determined by the analyzer (FIG. 1, 104), may be measured by a unit, such as percentage similar. An author (FIG. 3, 312) may dictate a threshold similarity percentage such that other posts (FIG. 3, 314) having a similarity with the base post (FIG. 3, 310) within the range are considered similar and those outside of the range are considered dissimilar. Still further, the author (FIG. 3, 312) may indicate a certain number of results to be presented as related posts, thus to not overwhelm a subscriber (FIG. 3, 316).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    an interface to, with a processor, receive, from a subscriber, an indication of content, wherein posts related to the content are presented in an activity stream of the subscriber, and receive a base post generated by an author;
    an analyzer to, with the processor, determine that the base post is related to the content and analyze the base post and a number of other posts;
    a search engine to, with the processor:
        identify from the number of other posts and based on the analysis, a number of related posts that are posted from a similar geographic area as the base post and posted at a similar time as the base post;
        remove from the number of related posts, a post already in an activity stream of the subscriber;
        group the number of related posts with the base post;
    a posting engine to, with the processor:
        select a presentation timing for the base post based on a presentation timing of the number of related posts, wherein the base post is separated from the number of related posts by a predetermined number of unrelated posts; and
        present the base post and the number of related posts in an activity stream of the subscriber; and
        update presentation characteristics based on how the number of related posts and base post are received by the subscriber.

2. The system of claim 1, wherein the posting engine presents the number of identified related posts based on at least one of a time delay and a content delay.

3. The system of claim 1, wherein an identification of the number of related posts and a timing of presentation of the number of related posts is based on historical data from the subscriber.

4. The system of claim 1, wherein an identification of the number of related posts and a timing of presentation of the number of related posts is based on historical data from a number of subscribers.

5. The system of claim 1, wherein the search engine identifies the number of related posts further based on a publication platform credibility.

6. The system of claim 1, wherein the search engine identifies the number of related posts further based on user rating.

7. The system of claim 1, wherein the posting engine identifies a relationship between the number of related posts and the base post.

8. The system of claim 1, wherein the posting engine hides a relationship between the number of related posts and the base post.

9. The system of claim 1, wherein the posting engine presents author-selected related posts along with the base post.

10. A computer-implemented method comprising:
    receiving, from a subscriber, an indication of content, wherein posts related to the content are presented in an activity stream of the subscriber;
    receiving a base post generated by an author;
    determining that the base post is related to the content;
    analyzing the text of the base post and a number of other posts;
    identifying from the number of other posts and based on the analysis, a number of related posts that are posted from a similar geographic area as the base post and posted at a similar time as the base post;
    removing from the number of related posts, a post already in an activity stream of the subscriber;
    grouping the number of related posts with the base post;
    selecting a presentation timing for the base post based on a presentation timing of the number of related posts, wherein the base post is separated from the number of related posts by a predetermined number of unrelated posts; and
    presenting the base post along with identified related posts in an activity stream of a subscriber; and
    updating presentation characteristics based on how the number of related posts and base post are received by the subscriber.

11. The computer-implemented method of claim 10, further comprising searching the activity stream of the subscriber to determine the presence of the number of other posts.

12. The computer-implemented method of claim 11, wherein the activity stream is searched for a predetermined period of time.

13. The computer-implemented method of claim 11, further comprising, preventing identification of other posts that are present in the activity stream as related posts to present along with the base post.

14. The computer-implemented method of claim 11, further comprising, favoring selection of other posts that are present in the activity stream as related posts to present along with the base post.

15. The computer-implemented method of claim 10, further comprising summarizing the contents of the number of related posts.

16. The computer-implemented method of claim 10, further comprising prompting the author to allow posting of the number of related posts along with the base post.

17. A computer program product, the computer program product comprising a computer readable storage medium having program instructions embodied therewith, the program instructions executable by a processor to cause the processor to:
    receive, from a subscriber, an indication of content, wherein posts related to the content are presented in an activity stream of the subscriber;
    receive a base post generated by an author;

determine that the base post is related to the content;
analyze the text of the base post and a number of other posts;
identify from the other posts and based on the analysis, a number of related posts which are posted from a similar geographic area as the base post and posted at a similar time as the base post;
remove from the number of related posts, a post already in an activity stream of the subscriber;
group the number of related posts with the base post;
select a presentation timing for the base post based on a presentation timing of the number of related posts, wherein the base post is separated from the number of related posts by a predetermined number of unrelated posts;
present the base post and the number of related posts in an activity stream of the subscriber; and
update presentation characteristics based on how the number of related posts and base post are received by the subscriber.

18. The computer program product of claim 12, further comprising program instructions executable by the processor to cause the processor to receive, from the author, an indication of similarity content by which the number of related posts are identified.

19. The computer program product of claim 12, wherein analyzing the text of the base post and a number of other posts comprises at least one of:
semantically analyzing the text; and
topically analyzing the text.

* * * * *